United States Patent [19]

Anderson et al.

[11] Patent Number: 5,133,586
[45] Date of Patent: Jul. 28, 1992

[54] ARTICULATED TRAILER COVER ASSEMBLY

[76] Inventors: Lowell D. Anderson, 10531 Orchard View La., Riverside, Calif. 92505; Patrick D. McClure, 14025 Laurel Dr., Riverside, Calif. 92503

[21] Appl. No.: 748,749
[22] Filed: Aug. 21, 1991
[51] Int. Cl.$^5$ .............................................. B60J 7/10
[52] U.S. Cl. .................................... 296/100; 105/377
[58] Field of Search ......................... 296/100; 105/377; 220/331, 333

[56] References Cited

U.S. PATENT DOCUMENTS

| | | | |
|---|---|---|---|
| 2,979,361 | 4/1961 | Eppinger et al. | 296/100 |
| 3,342,523 | 9/1967 | Lutgen | 296/100 |
| 3,628,828 | 12/1971 | Page et al. | 296/100 |
| 3,640,565 | 2/1972 | Anderson | 296/137 |
| 3,861,737 | 1/1975 | Kirkbride | 296/100 |
| 4,068,886 | 1/1978 | Gostomski | 296/137 |
| 4,302,044 | 11/1981 | Sims | 296/183 |
| 4,542,931 | 9/1985 | Walker et al. | 296/100 |
| 4,585,266 | 4/1986 | Steinberg | 296/100 |
| 4,585,267 | 4/1986 | Friesen | 296/100 |
| 4,627,658 | 12/1986 | Vold et al. | 296/100 |
| 4,741,570 | 5/1988 | Lovaas | 296/100 |
| 4,909,561 | 3/1990 | Lovaas | 296/100 |
| 4,974,898 | 12/1990 | Baranski | 296/100 |

Primary Examiner—Robert R. Song
Attorney, Agent, or Firm—Stetina and Brunda

[57] ABSTRACT

An articulated cover assembly for covering the top opening of trailers and the like having two covers which are movable between a position covering at least a portion of the top opening of a trailer and a position substantially removed from the trailer. The covers travel upon a track such that they may be rolled between the opened and closed positions. The covers are preferably comprised of a rigid material, such as plastic or fiberglass. A tongue and groove interface intermediate the two covers provides a seal therebetween. The track may be comprised of two track sections: a horizontal first track section comprised of two elongate rails positioned upon opposite sides of the trailer and extending horizontally therealong, and a second track section comprised of two elongate rails positioned at either end of the trailer and sloping downward from approximately the height of the first track section. Rollers contacting the first track section are mounted upon a trunnion plate to facilitate variances in the angular orientation of the cover relative to the rollers as the cover moves between the open and closed positions. An electric motor and chain drive may be utilized to move the covers between the open and closed positions.

10 Claims, 3 Drawing Sheets

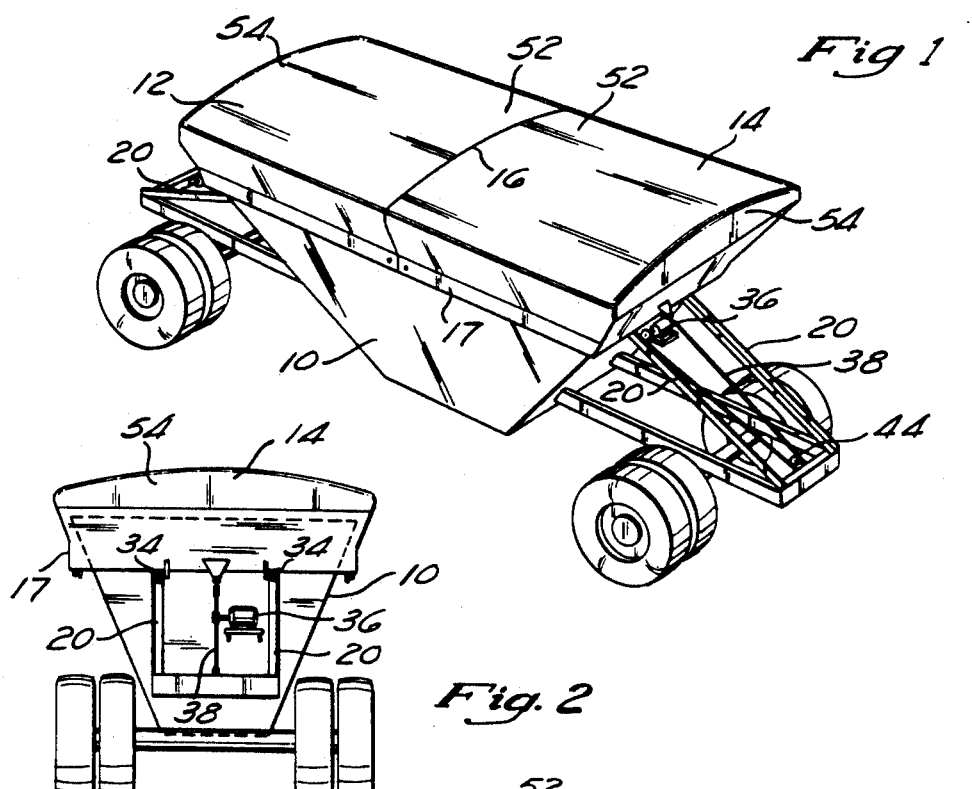
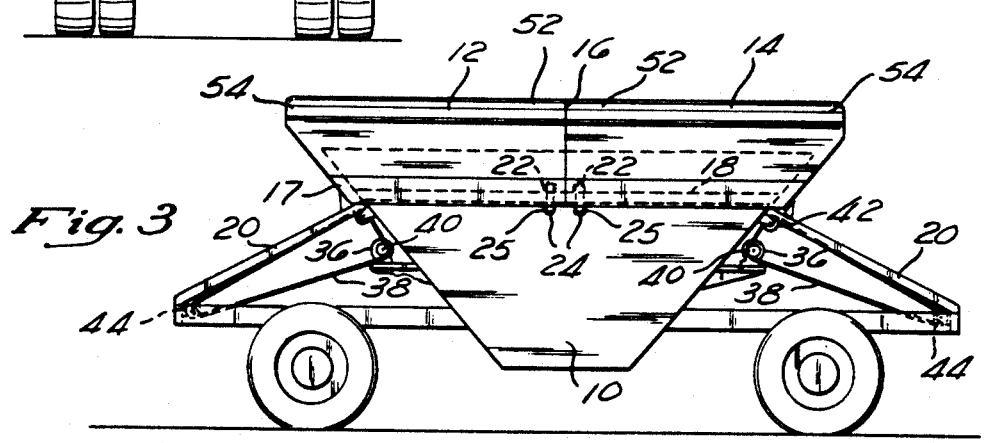
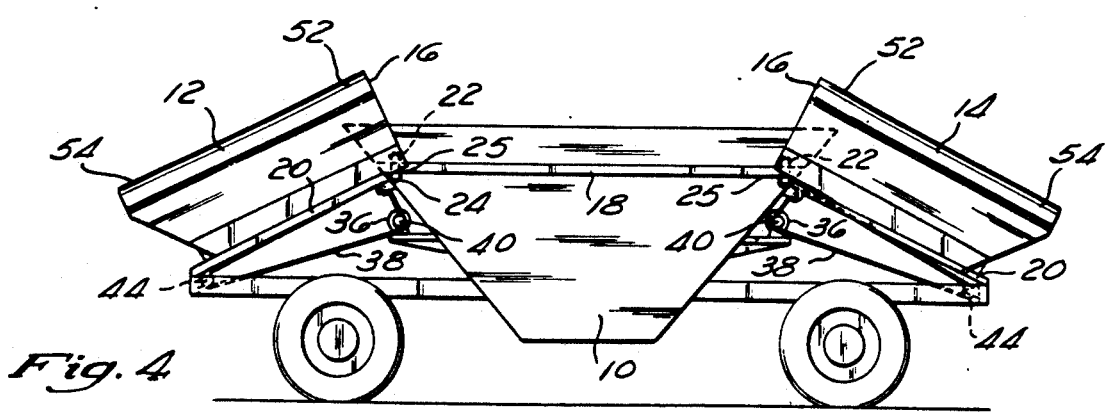

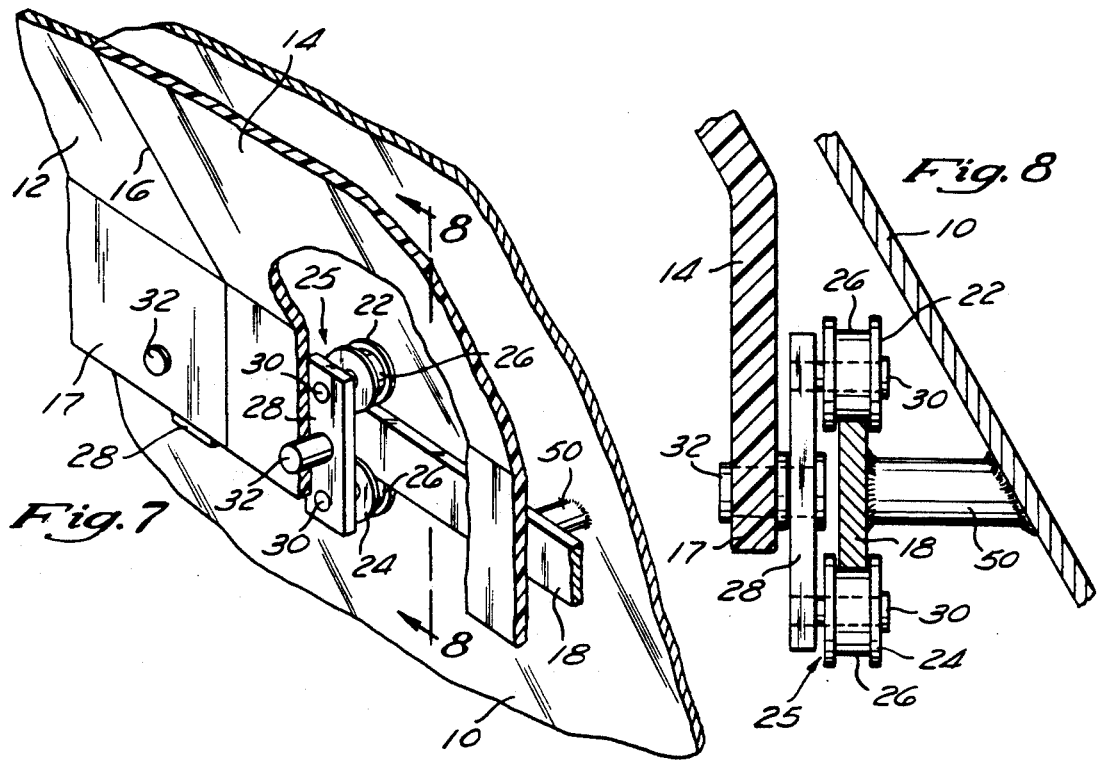
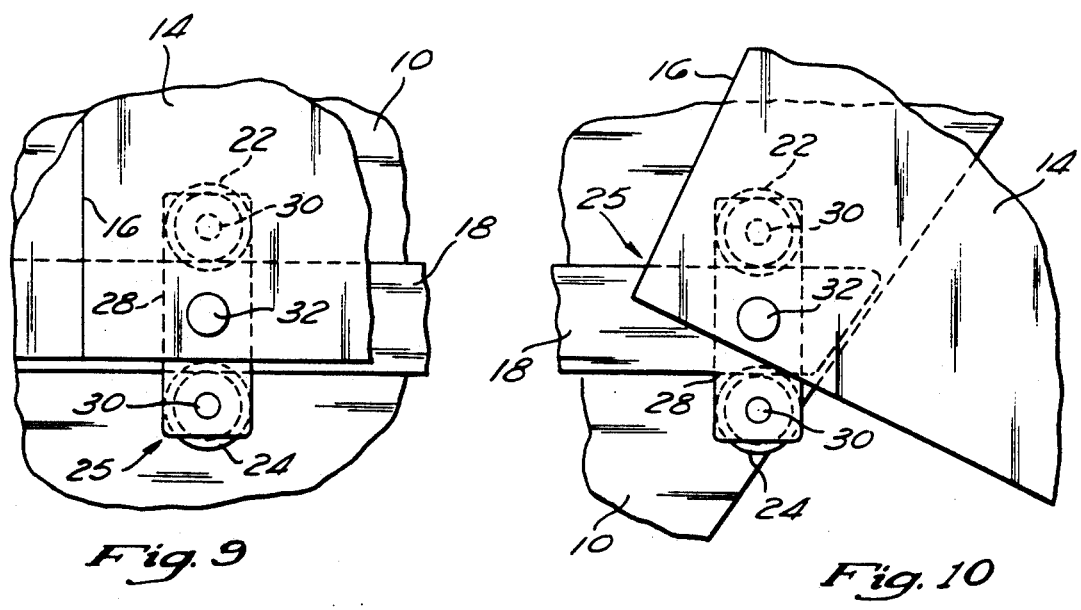

ARTICULATED TRAILER COVER ASSEMBLY

FIELD OF THE INVENTION

The present invention relates generally to covers for open-top trailers and more particularly to an articulated cover assembly for covering the top opening of belly-dump vehicular trailers and the like.

BACKGROUND OF THE INVENTION

Covers for open-topped vehicular trailers, pickup truck beds, and the like are well known. Construction trucks often tow belly-dump and other open-topped trailers to transport granular material from a stockyard to a construction site. Such granular material typically comprises gravel or the like and is subject to being shaken or blown from the trailer during highway travel. Such debris may then strike following vehicles, potentially causing damage thereto. It is not uncommon for such debris to crack a windshield and/or chip the vehicle's paint, often resulting in the need for costly repair. In view of the high occurrence of damage caused by such debris, many states have enacted or are contemplating enacting legislation which will require all truck trailers to be covered during the transportation of such loads upon the highways.

It has been common practice to cover such loads with tarps to prevent debris from blowing or being shaken from the trailer. However, tarps are difficult and time consuming to install and are subject to being dislodged by impinging wind encountered during highway travel. Slidably or pivotally movable rigid covers have also been recently developed to cover the open tops of belly-dump and other such trailers.

One example of such a cover is provided in U.S. Pat. No. 4,585,267, issued to Friesen. The Friesen patent discloses a cover arrangement for a truck bed which is provided with a pair of rigid cover panels which extending along the length of the truck bed adapted to close at the longitudinal center line thereof. The cover panels are manually pivotable from the closed abutting position to an open position alongside the walls of the truck bed.

Another cover assembly is disclosed in U.S. Pat. No. 4,741,570, issued to Lovass. The Lovass cover assembly is intended for use upon a vehicle bed, such as that of a pickup truck, and includes a plurality of rigid, telescoping cover members longitudinally movable upon slide assemblies mounted along the side of the vehicle bed. Latching apparatus releasably secure the respective cover members over the front and rear end of the vehicle bed and permit opening of the cover to expose either the front portion or the rear portion of the bed. The Lovass device does not facilitate opening of the complete truck bed for maximum access thereto.

Although such trailer covers have proven generally suitable for their intended purposes, they possess inherent deficiencies which detract from their overall effectiveness in the marketplace. Pivoting covers, such as that of the Friesen patent, must be manually operated and therefore require time and effort to open and close. Sliding covers, such as that disclosed by Lovass, and also manually operated and additionally do not permit ready access to the entire trailer, but rather always cover a portion of the trailer's opening. As such, there exists a need in the art for a cover which may rapidly and automatically be articulated between open and closed positions, which will reliably remain in position during highway travel, and which provides full access to the interior of the trailer.

SUMMARY OF THE INVENTION

The present invention specifically addresses and alleviates the above-mentioned deficiencies associated in the prior art. More particularly, the present invention comprises an automated articulated cover assembly for covering the top opening of trailers and the like. The articulated cover assembly has two covers which are movable between a position covering at least a portion of the top opening of a trailer and a position substantially removed from the trailer wherein the top opening is not covered. The covers travel upon a track such that they may be rolled between the opened and closed positions.

The covers are preferably comprised of a substantially rigid material, such as plastic or fiberglass, and thus are not subject to being damaged in construction environments and/or dislodged by wind. A tongue and groove interface intermediate the two covers provides a substantially air tight seal therebetween. A seal similarly seals the interface between the covers and the trailer. Thus, fine powders and water-sensitive products may be hauled without significant loss from the trailer.

The track may be comprised of two track sections: a first track section having two elongate rails positioned upon opposite sides of the trailer and extending horizontally therealong, and a second track section having two elongate rails positioned at either end of the trailer and sloping downwardly from approximately the height of the first track section. Rollers contacting the first track section are mounted upon a trunnion plate to facilitate variances in the angular orientation of the cover relative to the rollers as the cover is articulated between its open and closed positions.

An electric motor and chain drive may be utilized to automatically articulate the covers between the open and closed positions. Substantially the entire top opening of the trailer is uncovered when the covers are disposed in the open position, such that ready access is provided to the entire trailer to facilitate rapid loading and unloading thereof.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of a belly-dump trailer having an articulated trailer cover assembly of the present invention installed thereon;

FIG. 2 is an end view of the trailer and cover assembly of FIG. 1;

FIG. 3 is a side elevational view of the trailer and cover assembly of FIG. 1;

FIG. 4 is an elevational side view of the trailer and cover assembly of FIG. 1 having the two covers disposed in the open position;

FIG. 7 is an enlarged sectional view of the rollers and track assembly;

FIG. 8 is an enlarged cross-sectional side view of the rollers and trunnion plate assembly of FIG. 7;

FIG. 9 is a side view of the rollers and trunnion plate assembly of FIGS. 7 and 8 showing the cover positioned upon the trailer such that the trunnion plate is aligned with the vertical axis of the cover; and FIG. 10 is an enlarged side view of the rollers and trunnion plate assembly showing the trunnion plate assembly disposed at an angle relative to the vertical axis of the cover as when the cover is disposed in the opened position.

DETAILED DESCRIPTION OF THE PREFERRED EMBODIMENT

Figure 5:
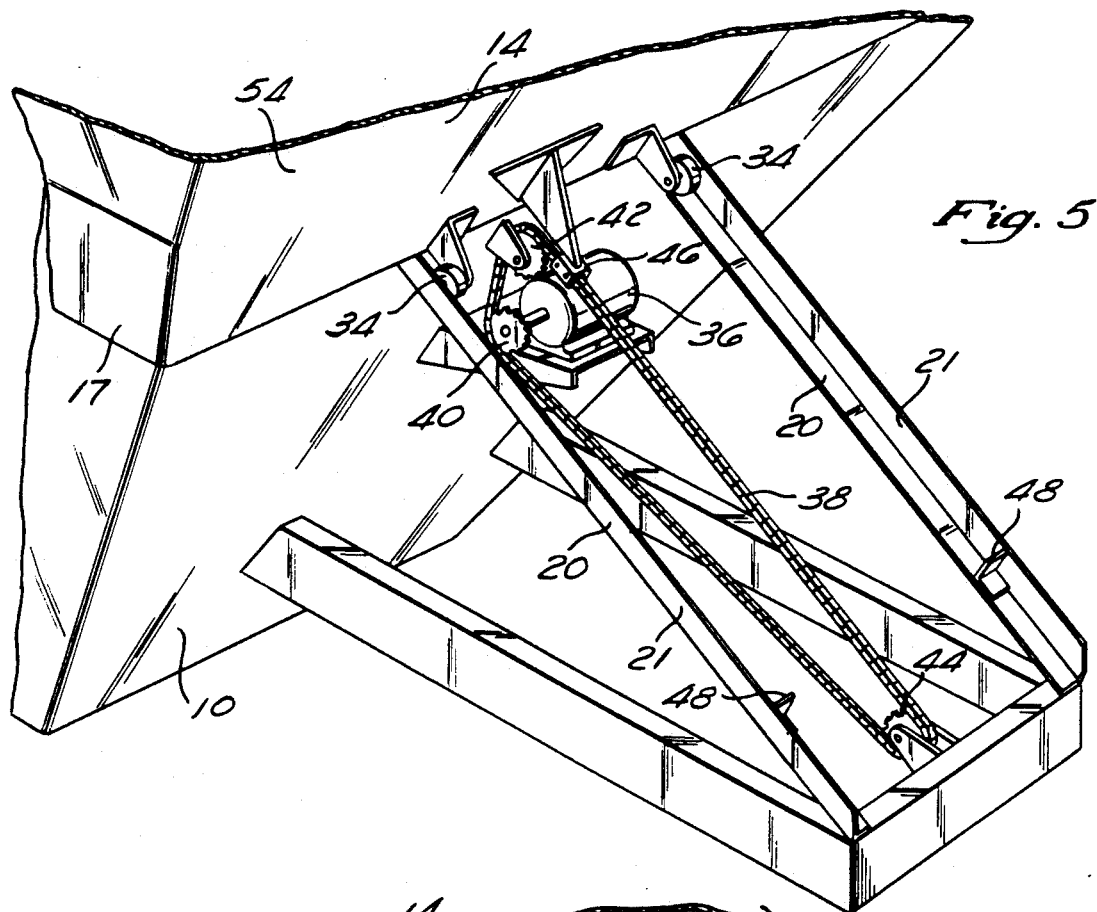
FIG. 5 is an enlarged sectional view of the ramp and drive assembly.

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The articulated cover assembly of the present invention is illustrated in FIGS. 1-10 which depict a presently preferred embodiment of the invention. Referring now to FIGS. 1-4, the articulated cover assembly is comprised generally of first 12 and second 14 covers movably disposed upon a trailer 10, such that they abut at their common interface 16. In the preferred embodiment, the covers 12 and 14 are fabricated from fiberglass or polymer materials to be substantially rigid members sufficient to withstand impact typically associated in construction environments. The first 12 and second 14 covers are articulated between a first or closed position (as shown in FIGS. 1-3) wherein they extend over the upper opening of the trailer 10 and a second or opened position (as shown in FIG. 4) wherein they are substantially removed from the upper opening of the trailer 10 to facilitate filling of the trailer 10.

Each cover 12 and 14 has two roller pairs 25 attached through trunnion plates 28 to the lower periphery thereof. The roller pairs 25 are attached proximate the abutting interface 16 of the covers 12 and 14. Each roller pair 25 has an upper 22 and lower 24 track roller which is disposed upon opposite sides of a first track section or track 18 such that the track 18 is captured therebetween. The tracks 18 are attached to the trailer 10 via post 50 (shown in FIGS. 6-8). The weight of the covers 12 and 14 is transferred by the upper track rollers 22 to the track 18.

The lower track rollers 24 prevent upward movement of the covers 12 and 14 at the interface 16 such that the inboard ends 52 of covers 12 and 14 are held firmly in place upon the trailer 10. Optionally, additional roller pairs (not shown) may be attached proximate the outboard ends 54 of the covers 12 and 14 to prevent upward movement thereof. Those skilled in the art will recognize that various detent and locking means are suitable for limiting the upward motion of the covers 12 and 14 and to hold them firmly in contact with the trailer, particularly when in the fully closed position. For example, a pair of lower ramp rollers (not shown) may be attached below the ramp rollers 34 (shown on FIGS. 5 and 6) which ride upon the ramps 20. Such lower ramp rollers would be disposed below the ramp 20 and function in a manner similar to the lower track rollers 24 to prevent the covers 12 and 14 from moving excessively upward. A trunnion plate assembly may likewise be utilized in conjunction with such lower ramp rollers. Alternatively, a second set of roller pairs (not shown) may be attached to each cover 12 and 14 proximate its outboard end 54 such that the second set of roller pairs travels upon the track 18 and the lower roller of each pair secures the outboard end 54 of the covers 12 and 14. Alternatively, a single lower roller (not shown) may be utilized at each outboard end 54 on either side of each cover 12 and 14 without a corresponding upper roller.

The tongue and groove interface 16 between the two covers 12 and 14 and the interface between the lower periphery 17 of the covers 12 and 14 and the trailer 10 preferably form substantially air-tight seals such that fine powders, e.g. cement, remain contained within the trailer 10 and such that moisture is effectively prevented from entering the trailer 10. Those skilled in the art will recognize that various seal configurations are possible. For example, flexible rubber seals, inflatable seals, and tongue and groove seals may be utilized. Thus, the articulated trailer cover assembly of the present invention makes it possible to carry powdered and/or water-sensitive material within belly-dump type trailers and the like.

Figure 6:
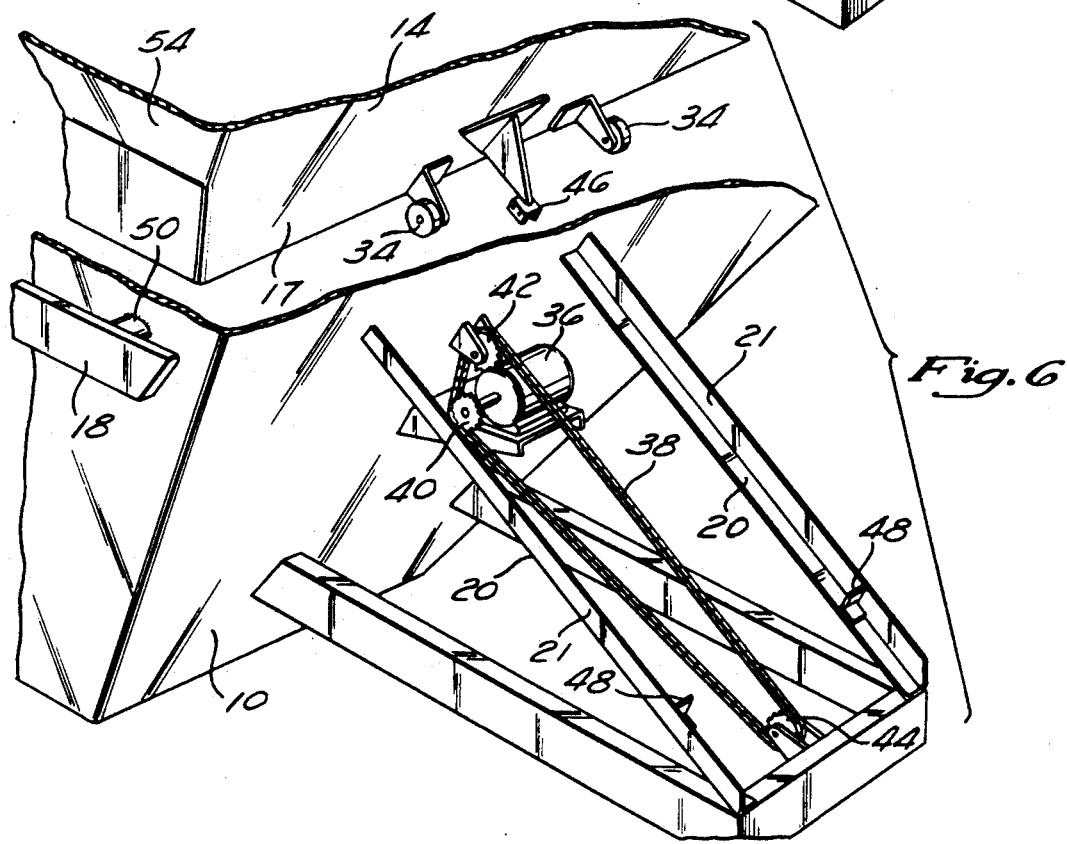
FIG. 6 is a sectional view of the drive and ramp assembly of FIG. 5 having the cover exploded away from the trailer to show the rail attached to the trailer.

Referring now to FIGS. 5 and 6, second track sections or ramps 20 extend downwardly from approximately the height of the first track sections 18 to facilitate movement of the covers 12 and 14 downward and away from the opening of the trailer 10. A pair of ramp rollers 34 are pivotally attached to the outboard end of each cover 12 and 14. The ramp rollers 34 roll upon the ramps 20 and support approximately one-half of the weight of the covers 12 and 14 when the covers 12 and 14 are disposed in the open position. The two track rollers 22 and 24 remain on the track 18 when the cover 12 or 14 is disposed in the open position and thus also support approximately one-half of the weight of the covers 12 and 14. Each ramp section 20 is preferably formed of a right-angle metal member such that the rollers 34 are captured thereupon between upwardly extending flanges 21 of the right-angle metal ramps 20. Thus, the ramp rollers 34 are guided and remain upon the ramps 20 during the opening and closing processes. Those skilled in the art will recognize that various other configurations are likewise suitable for preventing lateral motion of the ramp rollers 34.

An electric drive motor 36 is attached to the trailer 10 and has a drive sprocket 40 connected to the armature thereof. A chain 38 travels upon the drive sprocket 40 of the electric motor 36 and between upper 42 and lower 44 sprockets. The chain 38 is attached to the cover 12 or 14 at attached point 46 such that rotation of the motor 36 in a first direction will affect movement of the cover 12 or 14 from the first or covered position to the second or uncovered position and rotation of the motor 36 in a second direction will affect movement of the cover 12 or 14 from the second or closed position to the first or opened position. The motor 36, sprockets 40, 42, and 44, and chain 38 are preferably disposed intermediate ramps 20.

Referring now to FIGS. 7-10, pivoting of the trunnion plate 28 with respect to one of the covers 14 is illustrated. The upper 22 and lower 24 track rollers attach to the cover via the trunnion plate 28 to prevent binding of the track rollers 22 and 24 about the tracks 18 as the covers 12 and 14 are moved into the open position. The upper 22 and lower 24 track rollers are pivotally attached to the trunnion plate 28 which is in turn pivotally attached to the cover 12 or 14 via trunnion pivot 32. The trunnion plate 28 and pivot 32 thus facilitate angular orientation variations between the cover 12 or 14 and the upper 22 and lower 24 track rollers as occurs during movement of the covers 12 and 14 in their transition between the open and closed positions. As seen in FIGS. 7-9, the trunnion plate is parallel to the vertical axis of the cover 14.

Referring now to FIG. 10, as the cover 14 is moved to the opened position (as shown in FIG. 4), the cover tilts such that its vertical axis forms an acute angle to true vertical and to the trunnion plate 28. Thus, the trunnion plate 28 is disposed at an angle with respect to the vertical axis of the cover 14 when the cover 14 is disposed in the opened position. Trunnion plate pivot 32 facilitates rotation of the cover 14 relative to the trunnion plate 28. Such rotation of the cover 14 relative to the trunnion plate 28 prevents binding of the upper 22 and lower 24 track rollers upon the track 18 as the cover 14 begins to move downward during the opening process.

Each upper 22 and lower 24 track roller comprises a groove 26 (best shown in FIG. 8) which receives a portion of the tracks 18 such that the upper 22 and lower 24 track rollers remain disposed upon the track 18. The groove 26 thus restricts lateral or side-to-side motion of the covers 12 and 14 relative to the trailer 10. The lower track rollers 24 insure that the covers 12 and 14 are maintained firmly in place upon the trailer 10 as described above.

Having thus described the structure of the articulated cover assembly of the present invention, it may be helpful to describe the operation thereof. Commencing with the covers 12 and 14 disposed in the first or closed position, the motor 36 is actuated to effect rotation of the sprocket 40 attached thereto such that the chain 38 pulls each cover 12 and 14 away from the other cover 14 and 12 and downward into the opened position. The ramp rollers 34 travel down the ramps 20, the outboard ends 54 of the covers 12 and 14 move downward and the trunnion plates 23 rotate relative to the covers 12 and 14. After traveling the length of the ramps 20, the covers 12 and 14 abut the stops 48 formed upon the ramps 20 and the rollers 34 come to a rest when the covers 12 and 14 are disposed in the completely opened position.

Reversal of the direction of rotation of the electric motors 36 effects closure of the covers 12 and 14 in a process which is the reverse of the opening. The ramp rollers 34 travel upward along the ramps 20 and the upper 22 and lower 24 track rollers travel along the track 18 toward the center thereof.

It is understood that the exemplary articulated cover assembly described herein and shown in the drawings represents only a presently preferred embodiment of the invention. Indeed, various modifications and additions may be made to such embodiment without departing from the spirit and scope of the invention. For example, any number of covers may be utilized. That is, the articulated cover assembly may be comprised of a single cover or may be comprised of multiple covers which are movable between a first position wherein the cover covers at least a portion of the top opening of the trailer and a second position wherein the cover is substantially removed from the trailer. Also, those skilled in the art will recognize that various sliding configurations are possible wherein the covers may be moved from their closed position to their opened position. Thus, these and other modifications and additions may be obvious to those skilled in the art and may be implemented to adapt the present invention for a variety of different applications.

What is claimed is:

1. An articulated cover assembly for covering the top opening of a trailer, the trailer having side walls and end walls, said cover assembly comprising;
    (a) at least one cover movable between a first position wherein said cover covers at least a portion of the top opening of the trailer and a second position wherein said cover is substantially removed from said trailer;
    (b) a pair of substantially horizontal first track sections for each cover mounted on the side walls of the trailer upon which the inboard end of said cover travels between the first and second positions; and
    (c) a pair of ramped second track sections for each cover extending downwardly and outwardly from one end wall of the truck upon which the outboard end of said cover travels between first and second positions.

2. The articulated cover assembly as recited in claim 1 further comprising:
    (a) a plurality of roller pairs attached to each cover, said roller pairs for slidably attaching said cover to said trailer, said roller pairs comprising:
        (i) at least one first roller disposed above at least one of said first track sections for supporting the weight of said cover; and
        (ii) at least one second roller disposed below said at least one first track section for holding said cover upon said trailer; and
    (b) at least one third roller attached proximate the outboard end of each cover and configured to move along at least one of said second track sections as said cover is moved from the first position to the second position.

3. The articulated cover assembly as recited in claim 2 wherein:
    (a) said first and second rollers of said roller pairs each comprise a groove for receiving a portion of said first track; and
    (b) said pair of second track sections comprises at least one angle member for capturing said third rollers thereon.

4. The articulated cover assembly as recited in claim 3 further comprising a trunnion plate pivotally attached to said cover such that said cover may vary in angular orientation relative to said roller pairs as said cover moves from the first position to the second position.

5. The articulated cover assembly as recited in claim 4 further comprising a drive for moving said cover between the first and second positions.

6. The articulated cover assembly as recited in claim 5 wherein said drive comprises:
    (a) an electric motor; and
    (b) a chain driven by said electric motor and connected to said cover such that rotation of said electric motor in a first direction moves said cover from the first position to the second position and rotation of said electric motor in a second direction moves said cover from the second position to the first position.

7. The articulated cover assembly as recited in claim 1 wherein said at least one cover comprises two covers configured to abut when disposed in said first position and configured to move in opposite directions when moving from the first position to the second position.

8. The articulated cover assembly as recited in claim 7 further comprising a seal for sealing the interface of said two covers and a seal for sealing each cover to the trailer.

9. The articulated cover assembly as recited in claim 8 wherein the interface seal comprises a tongue and groove interface.

10. The articulated cover assembly as recited in claim 9 wherein said cover is comprised of a rigid material.

* * * * *